(12) United States Patent
Matsushita et al.

(10) Patent No.: US 12,360,348 B2
(45) Date of Patent: Jul. 15, 2025

(54) INFRARED IMAGING LENS

(71) Applicant: Nippon Electric Glass Co., Ltd., Otsu (JP)

(72) Inventors: Yoshimasa Matsushita, Otsu (JP); Fumio Sato, Otsu (JP); Nobuo Hori, Higashimatsuyama (JP)

(73) Assignee: Nippon Electric Glass Co., Ltd., Shiga (JP)

( * ) Notice: Subject to any disclaimer, the term of this patent is extended or adjusted under 35 U.S.C. 154(b) by 739 days.

(21) Appl. No.: 17/626,930

(22) PCT Filed: Jul. 17, 2020

(86) PCT No.: PCT/JP2020/027759
§ 371 (c)(1),
(2) Date: Jan. 13, 2022

(87) PCT Pub. No.: WO2021/015106
PCT Pub. Date: Jan. 28, 2021

(65) Prior Publication Data
US 2022/0276467 A1    Sep. 1, 2022

(30) Foreign Application Priority Data

Jul. 24, 2019    (JP) .................. 2019-136421

(51) Int. Cl.
*G02B 9/34* (2006.01)
*G02B 7/02* (2021.01)
*G02B 13/00* (2006.01)

(52) U.S. Cl.
CPC ........... *G02B 13/008* (2013.01); *G02B 7/028* (2013.01); *G02B 9/34* (2013.01); *G02B 13/004* (2013.01)

(58) Field of Classification Search
CPC ........ G02B 9/34; G02B 13/004; G02B 13/14; G02B 13/008; G02B 13/06; G02B 13/18; G02B 7/028
(Continued)

(56) References Cited

U.S. PATENT DOCUMENTS

| 5,446,581 A | 8/1995 | Jamieson |
| 8,179,616 B1 | 5/2012 | Hsu et al. |

(Continued)

FOREIGN PATENT DOCUMENTS

| CN | 102466861 A | 5/2012 |
| CN | 102608729 A | 7/2012 |

(Continued)

OTHER PUBLICATIONS

Lin et al., Mid-infrared optical properties of chalcogenide glasses within tin-antimony-selenium ternary system, Oct. 2017, Optics Express, vol. 25, No. 21 (Year: 2017).*

(Continued)

*Primary Examiner* — Wyatt A Stoffa
*Assistant Examiner* — Samanvitha Sridhar
(74) *Attorney, Agent, or Firm* — Harness, Dickey & Pierce, P.L.C.

(57) ABSTRACT

The present invention achieves an infrared imaging lens which is excellent in performance capability such as aberration despite its wide angle of view and which is adaptable to a far infrared region.
An infrared imaging lens (1) includes: a first lens (L1) having negative refractive power; a second lens (L2) which is a meniscus that is convex to an image surface side; and an image surface side lens group (G) having positive refractive power, the first lens, the second lens, and the image surface side lens group being disposed in this order from an object side to the image surface side, the first lens and the second (Continued)

Example 1 lens each being made of glass having a refractive index of not less than 2.8 measured at a wavelength of 10 μm, and the infrared imaging lens having a half angle of view of not less than 60°.

10 Claims, 8 Drawing Sheets

(58) Field of Classification Search
USPC .................................................. 359/356, 715
See application file for complete search history.

(56) References Cited

U.S. PATENT DOCUMENTS

| | | | |
|---|---|---|---|
| 2007/0091457 A1 | | 4/2007 | Asami |
| 2007/0191457 A1 | | 8/2007 | Bonanomi et al. |
| 2012/0176668 A1 | * | 7/2012 | Saito ...................... G02B 1/041 |
| | | | 359/357 |
| 2018/0275378 A1 | | 9/2018 | Suzuki |
| 2019/0025555 A1 | | 1/2019 | Cook |
| 2019/0369364 A1 | | 12/2019 | Shobayashi et al. |
| 2020/0142160 A1 | * | 5/2020 | Oskotsky ............... G02B 13/04 |

FOREIGN PATENT DOCUMENTS

| | | | |
|---|---|---|---|
| CN | 105044887 A | | 11/2015 |
| CN | 206479705 U | * | 9/2017 |
| JP | 2013-228539 A | | 11/2013 |
| JP | 2016-018162 A | | 2/2016 |
| WO | WO-2017/094744 A1 | | 6/2017 |
| WO | WO-2018/163831 A1 | | 9/2018 |

OTHER PUBLICATIONS

Zhu et al., Surface crystallization behavior and physical properties of (GeTe4)85(AgI)15 chalcogenide glass, Sep. 2017, Infrared Physics & Technology, 86, pp. 135-138 (Year: 2017).*
Abdellaoui et al., Tb3+ doped Ga5Ge20Sb10Se65-xTex (x=0-37.5) chalcogenide glasses and fibers for MWIR and LWIR emissions, Sep. 2018, Optical Materials Express, vol. 8, No. 9 (Year: 2018).*
Chandler-Horowitz et al., High-accuracy, midinfrared refractive index values of silicon, Jun. 2005, J. Appl. Phys. 97, 123526 (Year: 2005).*
Melles Griot Practical Application of Light: Catalogue, "Lens Shape"; "Aberration Balancing"; 1999, p. 1.17, 1.27-1.28 (Year: 1999).*
International Search Report and Written Opinion dated Oct. 6, 2020.
International Preliminary Report on Patentability dated Jan. 25, 2022.
Chinese Office Action for Chinese Application No. 202080045155.0 and English translation thereof dated May 7, 2024.
Japanese Office Action for JP 2021-533994 mailed Oct. 3, 2023 and English machine translation thereof.
Extended European Search Report dated Jul. 31, 2023.
Chinese Office Action and English translation thereof dated Sep. 23, 2023.

* cited by examiner

FIG. 1

Example 1

Example 1

Example 1

FIG. 7
Example 1

FIG. 8

| | | Sample | | | | | | | | | |
|---|---|---|---|---|---|---|---|---|---|---|---|
| | | 1 | 2 | 3 | 4 | 5 | 6 | 7 | 8 | 9 | 10 |
| Glass composition (mol%) | Te | 77.5 | 75 | 72.5 | 70 | 80 | 80 | 80 | 77.5 | 77.5 | 80 |
| | Ge | 15 | 15 | 15 | 15 | 15 | 15 | 17.5 | 17.5 | 15 | 12.5 |
| | Ga | 5 | 5 | 5 | 5 | 2.5 | 5 | 2.5 | 5 | 7.5 | 7.5 |
| | Ag | 2.5 | 5 | 7.5 | 10 | 2.5 | | | | | |
| | Sn | | | | | | | | | | |
| | I | | | | | | | | | | |
| Refractive index (n10) | | 3.48 | 3.47 | 3.46 | 3.45 | 3.48 | 3.49 | 3.51 | 3.48 | 3.46 | 3.44 |
| Abbe number (ν10) | | 257 | 253 | 251 | 251 | 258 | 260 | 258 | 256 | 255 | 256 |
| Infrared absorption edge wavelength (μm) | | 24.3 | 24.2 | 24.2 | 24.3 | 24.3 | 24.3 | 24.1 | 24.3 | 24.2 | 24.1 |
| Glass transition temperature | | 155 | 157 | 164 | 167 | 141 | 149 | 148 | 158 | 158 | 143 |

| | | Sample | | | | | | | | | |
|---|---|---|---|---|---|---|---|---|---|---|---|
| | | 11 | 12 | 13 | 14 | 15 | 16 | 17 | 18 | 19 | 20 |
| Glass composition (mol%) | Te | 82.5 | 75 | 70 | 70 | 75 | 70 | 80 | 30 | 33 | 32 |
| | Ge | 12.5 | 15 | 17 | 19 | 15 | 17 | 15 | 45 | 37 | 33 |
| | Ga | 5 | 4 | 3 | 5 | 4 | 9 | 3 | 12.5 | 15 | 17.5 |
| | Ag | | 3 | 5 | 3 | | | | 12.5 | 15 | 17.5 |
| | Sn | | | | | 6 | 4 | 2 | | | |
| | I | | 3 | 5 | 3 | | | | | | |
| Refractive index (n10) | | 3.49 | 3.42 | 3.4 | 3.45 | 3.49 | 3.44 | 3.49 | 3.88 | 3.87 | 3.77 |
| Abbe number (ν10) | | 262 | 253 | 248 | 245 | 253 | 252 | 260 | 278 | 280 | 269 |
| Infrared absorption edge wavelength (μm) | | 24.1 | 24.3 | 24.3 | 24.2 | 24.1 | 24.2 | 24.2 | 24.1 | 24.2 | 24.1 |
| Glass transition temperature | | 141 | 154 | 165 | 166 | 155 | 167 | 143 | 187 | 182 | 180 |

| | | Sample | | | |
|---|---|---|---|---|---|
| | | 21 | 22 | 23 | 24 |
| Glass composition (mol%) | Te | 33 | 55 | 45 | 65 |
| | Ge | 22 | 3 | 1 | 28 |
| | Ga | 10 | 2 | 42 | 7 |
| | Ag | 35 | 40 | | |
| | Sn | | | | |
| | I | | | 12 | |
| Refractive index (n10) | | 3.62 | 3.32 | 3.24 | 3.92 |
| Abbe number (ν10) | | 270 | 243 | 230 | 285 |
| Infrared absorption edge wavelength (μm) | | 24.3 | 24.2 | 24.2 | 24.2 |
| Glass transition temperature | | 181 | 152 | 155 | 172 |

INFRARED IMAGING LENS

TECHNICAL FIELD

The present invention relates to an infrared imaging lens.

BACKGROUND ART

An infrared camera for photographing a subject with use of infrared radiation in a far infrared region, in particular, a wavelength region of approximately 8 µm to 14 µm, which wavelength region is suitable for biodetection, is applied to a surveillance camera, a security camera, and an in-vehicle night vision system. An infrared imaging lens which is applied to such an infrared camera is constituted by using a lens that is made of a material having a relatively high transmittance in a wavelength region of 8 µm to 14 µm.

Examples of a material which has been used as such a material include germanium (Ge), silicon (Si), zinc sulfide (ZnS), zinc selenide (ZnSe), and chalcogenide glass.

CITATION LIST

Patent Literatures

[Patent Literature 1]
International Publication No. WO2017/094744A1
[Patent Literature 2]
International Publication No. WO2018/163831A1

SUMMARY OF INVENTION

Technical Problem

Materials such as Ge, Si, ZnS, and ZnSe are also referred to as crystalline materials and are inferior in processability required for lens formation. In particular, such a material, which cannot be processed by press molding (molding), not only causes an increase in lens cost but also makes it difficult to industrially mass-produce an aspherical lens.

In that regard, chalcogenide glass can be press-molded so as to make it possible to mass-produce an aspherical lens. However, conventional chalcogenide glass has a refractive index, measured in a far infrared region, of less than 2.8, which is smaller than refractive indexes of the above crystalline materials.

Thus, even application of any of the crystalline materials and the conventional chalcogenide glass makes it difficult to, while achieving low aberration or preventing or reducing a decrease in peripheral light quantity, achieve a wide-angle of view infrared imaging lens which is required particularly for use in, for example, a surveillance camera and a security camera.

An aspect of the present invention focuses on the problems and has an object to achieve an infrared imaging lens in which, despite its wide angle of view, low aberration is achieved or a decrease in peripheral light quantity is prevented or reduced and which is adaptable to a far infrared region and has an excellent performance capability.

Solution to Problem

In order to attain the object, an infrared imaging lens in accordance with an aspect of the present invention includes: a first lens having negative refractive power; a second lens which is a meniscus that is convex to an image surface side; and an image surface side lens group having positive refractive power, the first lens, the second lens, and the image surface side lens group being disposed in this order from an object side to the image surface side, the first lens and the second lens each being made of glass having a refractive index of not less than 2.8 measured at a wavelength of 10 µm, and the infrared imaging lens having a half angle of view of not less than 60°.

Advantageous Effects of Invention

An aspect of the present invention makes it possible to achieve an infrared imaging lens in which, despite its wide angle of view, low aberration is achieved or a decrease in peripheral light quantity is prevented or reduced and which is adaptable to a far infrared region and has an excellent performance capability.

DESCRIPTION OF EMBODIMENTS

An embodiment of the present invention will be specifically described below.

Example 1

Figure 1:
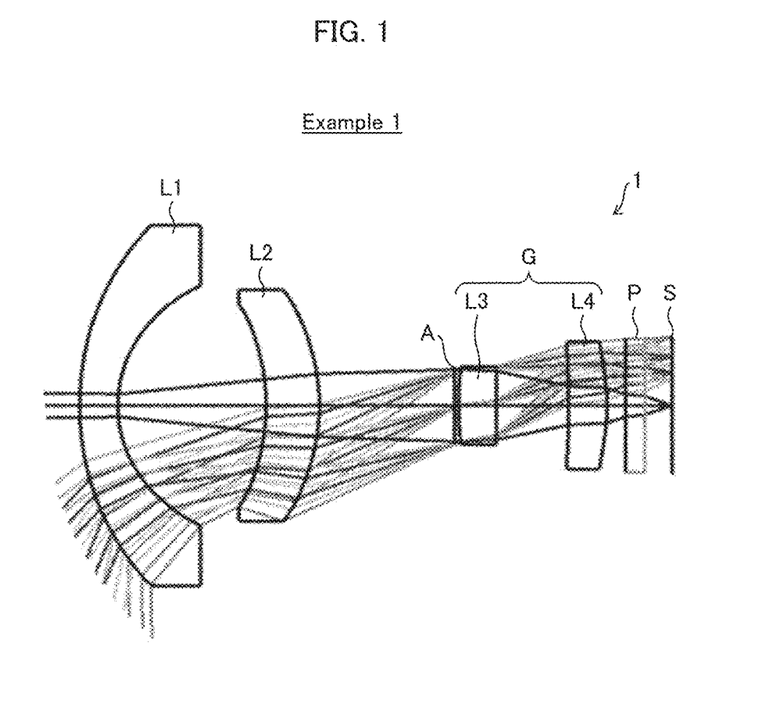
FIG. 1 is a cross-sectional view schematically illustrating a configuration of an infrared imaging lens in accordance with Numerical Example 1 in connection with an embodiment of the present invention.

An infrared imaging lens 1 in accordance with Example 1 is a lens system which is adaptable to at least a far infrared wavelength region and which forms an image of a subject on an image surface S of, for example, an image sensor. FIG. 1 is a cross-sectional view schematically illustrating a configuration of the infrared imaging lens 1 and taken along an optical axis.

<Overview of Infrared Imaging Lens>

An overview of the infrared imaging lens 1 is as described below. The infrared imaging lens 1 includes a first lens L1, a second lens L2, an aperture diaphragm A, and an image surface side lens group G which are disposed in this order from an object side to an image surface side. As illustrated in FIG. 1, a parallel flat plate P is disposed between the image surface side lens group G and the image surface S. The parallel flat plate P is an optical window which is hermetically sealed so as to be loaded on the image surface side, and is made of silicon, hypoxic silicon, or germanium. The material and thickness of the parallel flat plate P can be determined in accordance with what image sensor to employ.

As a specific example of Example 1, the image surface side lens group G includes a third lens L3 and a fourth lens L4 which are disposed in this order from the object side to the image surface side. The first lens L1 to the fourth lens L4 uniformly move in the optical axis direction during focusing.

The first lens L1, the second lens L2, the third lens L3, the fourth lens L4, and the parallel flat plate P each have an anti-reflection (AR) coated surface. It is possible to apply an appropriate known technique to such anti-reflection coating in a far infrared region.

The first lens L1 has negative refractive power and has a meniscus shape having a convex surface which is oriented to the object side. The first lens L1 is an aspherical lens and has (i) an object side surface (first surface) which is an aspherical surface and (ii) an image surface side surface (second surface) which is a spherical surface.

The second lens L2 has positive refractive power and has a meniscus shape having a convex surface which is oriented to the image surface side. The second lens L2 is an aspherical lens and has (i) an object side surface (third surface) which is an aspherical surface and (ii) an image surface side surface (fourth surface) which is an aspherical surface. The second lens L2 can have refractive power which is negative or 0.

The image surface side lens group G has positive refractive power. As a specific example of Example 1, the third lens L3 is a biconvex lens having positive refractive power. The third lens L3 is an aspherical lens and has (i) an object side surface (sixth surface) which is an aspherical surface and (ii) an image surface side surface (seventh surface) which is a spherical surface. The fourth lens L4 has positive refractive power and has a meniscus shape having a convex surface which is oriented to the image surface side. The fourth lens L4 is an aspherical lens and has (i) an object side surface (eighth surface) which is a spherical surface and (ii) an image surface side surface (ninth surface) which is an aspherical surface.

<First Lens and Second Lens>

The infrared imaging lens 1 includes a characteristic feature below particularly in the first lens L1 and the second lens L2. Such a characteristic feature allows the infrared imaging lens 1 to have a favorable image formation property such that, despite its half angle of view ω of more than 60°, occurrence of aberration and a decrease in peripheral light quantity are prevented or reduced in a far-infrared wavelength range. The half angle of view ω is preferably as great as not less than 80°.

The first lens L1 and the second lens L2 are made of a glass material which has a refractive index of not less than 2.8 measured at a wavelength of 10 µm and is light-transmissive at least in a far-infrared wavelength range of 8 µm to 14 µm. The first lens L1 and the second lens L2 preferably have a refractive index of not less than 3 measured at a wavelength of 10 µm. The first lens L1 and the second lens L2 more preferably have a refractive index of not less than 3.3 measured at a wavelength of 10 µm. The refractive index has an upper limit which is not particularly limited but is practically not more than 4. The first lens L1 and the second lens L2 are thus made of novel glass, specifically, chalcogenide glass which is highly light-transmissive in the far-infrared wavelength range and has a high refractive index.

The applicants of the present invention have newly developed chalcogenide glass including such features as described above. For example, a method for producing the chalcogenide glass will be described later.

It is possible to use an "infrared absorption edge wavelength" and an "internal transmittance" as indicators, indicating that chalcogenide glass is highly light-transmissive in a far infrared region. Note here that the infrared absorption edge wavelength refers to an absorption edge wavelength in a far infrared region at a wavelength of not less than 8 µm and is defined by a wavelength at which a light transmittance of 20% is obtained at a thickness of 2 mm of the material. The term "internal transmittance" refers to a transmittance inside the material and does not include a reflection loss on a surface of the material.

Chalcogenide glass of which the first lens L1 and the second lens L2 are made has an infrared absorption edge wavelength of not less than 20 µm. Thus, the chalcogenide glass also transmits therethrough infrared radiation having a wavelength of more than 12 µm, and has a good transmittance at least in a wavelength range of 8 µm to 14 µm. The chalcogenide glass has an internal transmittance, measured at a thickness of 2 mm, of not less than 90% at a wavelength of 12 µm.

The chalcogenide glass has an Abbe number of 180 to 300. The chalcogenide glass preferably has an Abbe number of 200 to 290. The first lens L1 and the second lens L2 are thus made of a characteristic material which has a relatively large Abbe number and which easily reduces chromatic aberration. Note that the Abbe number as used herein is defined in numerical examples described later.

The first lens L1 has a refractive index as high as not less than 2.8 and also has a negative meniscus shape having the convex surface which is oriented to the object side. This makes it possible to collect light beams from the object side to a wide angle of incidence and to achieve a wide-angle of view infrared imaging lens having a half angle of view ω of not less than 60°. The infrared imaging lens can be preferably configured to have a half angle of view ω of not less than 80°.

The second lens L2 has a refractive index as high as not less than 2.8 and has a positive meniscus shape having the convex surface which is oriented to the image surface side. Thus, a light beam having a large angle of incidence (an image surface surrounding area) can be widened outward (the fourth surface has a larger effective diameter than the third surface). This makes it possible to reduce vignetting of light beams at a peripheral image height and to prevent or reduce a decrease in peripheral light quantity.

The first lens L1 and the second lens L2, which are configured under such conditions, achieve the infrared imaging lens 1 in which, despite its half angle of view ω of more than 60°, an angle from the optical axis of a light beam incident on the third lens L3 is narrowed to about a range of the angle from the optical axis in a standard lens. For example, the infrared imaging lens 1 which has a half angle of view ω of approximately 90° allows the angle from the optical axis of the light beam incident on the third lens L3 to be approximately up to 40° and to prevent or reduce occurrence of aberration as much as possible. The first lens L1 and the second lens L2 are preferably configured to have combined refractive power which is negative or 0.

Crystalline materials, such as silicon (Si), germanium (Ge), zinc sulfide (ZnS), and zinc selenide (ZnSe), each of which is used as a material that is transmitted through a far infrared region, cannot be press-molded. This makes it difficult to mass-produce an aspherical lens having a complicated shape. It is therefore difficult to use such a crystalline material to achieve a low-cost commercial aspherical lens.

Note that conventional chalcogenide glass has a refractive index as low as less than 2.8 measured at a wavelength of 10 μm. It is therefore difficult for such a material to achieve a wide-angle of view infrared imaging lens in which aberration is sufficiently prevented or reduced or a decrease in peripheral light quantity is prevented or reduced.

In contrast, the first lens L1 and the second lens L2, which are made of chalcogenide glass that can be press-molded, make it possible to produce an aspherical lens with high mass productivity. The first lens L1 and the second lens L2 preferably have a glass transition temperature as low as not more than 200° C. and are desirably easily press-molded. Note that the glass transition temperature is also preferably not more than 180° C. The first lens L1 and the second lens L2 which are aspherical lenses allow aberration to be prevented or reduced. In a case where lenses to which aspherical surfaces are not applied are used for these lenses, an imaging lens for preventing or reducing aberration will be configured to have more lenses.

<Image Surface Side Lens Group>

The aperture diaphragm A which serves as a fifth surface is provided between the second lens L2 and the image surface side lens group G. Thus, a light beam can be incident on the image surface side lens group G at a low height. This makes it possible to prevent or reduce comatic aberration.

The third lens L3 and the fourth lens L4 which serve as specific examples of Example 1 of the image surface side lens group G are also made of chalcogenide glass, which is similar to the chalcogenide glass of which the first lens L1 and the second lens L2 are made, so as to be molded. In this case, aberration is effectively prevented or reduced because the third lens L3 and the fourth lens L4 can also be aspherical lenses.

Note that the image surface side lens group can be made of, for example, Ge. The image surface side lens group which is made of Ge makes it difficult to achieve an aspherical lens. Thus, the image surface side lens group G which is composed of two spherical lenses causes aberration which is greater than that of Numerical Example 1. The image surface side lens group can be thus configured provided that the infrared imaging lens 1 is an infrared imaging lens which is adaptable to an image sensor having a larger pixel pitch than an image sensor to which Numerical Example 1 is directed. Alternatively, the image surface side lens group G which is composed of not less than three lenses can reduce aberration but results in a complicated configuration and high cost.

The image surface side lens group can be alternatively composed of a single lens. The image surface side lens group which is composed of a single lens causes aberration which is greater than that of Numerical Example 1. The image surface side lens group can be thus configured provided that the infrared imaging lens 1 is an infrared imaging lens which is adaptable to an image sensor having a larger pixel pitch than an image sensor to which Numerical Example 1 is directed.

Numerical Example 1

Next, the following description will discuss a numerical example of the infrared imaging lens 1 of Example 1. The cross-sectional view of the infrared imaging lens in accordance with Numerical Example 1 is as illustrated in FIG. 1. In Numerical Example 1, r represents a radius of curvature, d represents an inter-surface distance on the optical axis, and ED represents an effective diameter (diameter). The unit of length is (mm). The symbol "*" (asterisk) following a number of the surface number represents an aspherical surface. Surface data, aspherical surface data, and various data are shown below.

TABLE 1

| Surface number: | r | d | | n10 | v10 | ED |
|---|---|---|---|---|---|---|
| (Object surface) | ∞ | ∞ | | | | |
| 1* | 18.96710 | 2.000 | | 3.46501 | 253.0 | 21.365 |
| 2 | 7.99533 | 7.794 | | | | 14.242 |
| 3* | −13.38789 | 2.800 | | 3.46501 | 253.0 | 12.039 |
| 4* | −12.46638 | 7.111 | | | | 13.708 |
| 5 (Diaphragm) | ∞ | 0.200 | | | | 4.597 |
| 6* | 21.17965 | 2.000 | | 3.46501 | 253.0 | 4.286 |
| 7 | −264.22890 | 3.785 | | | | 4.655 |
| 8 | −54.37844 | 2.000 | | 3.46501 | 253.0 | 7.107 |
| 9* | −13.83381 | 1.917 | (※) | | | 7.587 |
| 10 | ∞ | 1.000 | | 3.41874 | 3129.0 | 7.859 |
| 11 | ∞ | 0.500 | | | | 7.915 |
| (Image surface) | | | | | | |

※ Variable by focusing

A refractive index and an Abbe number are as defined below.

Refractive index n8: a refractive index measured at a wavelength of 8 μm
Refractive index n10: a refractive index measured at a wavelength of 10 μm
Refractive index n12: a refractive index measured at a wavelength of 12 μm
Abbe number v10: v10=(n10−1)/(n8−n12)

TABLE 2

First surface
k = 0.0000000E+00, A4 = 6.9160609E−05, A6 = −7.1679573E−07,
A8 = 4.0501325E−09, A10 = −3.8071869E−12
Third surface
k = 0.0000000E+00, A4 = 1.2464676E−04, A6 = 2.4769910E−06,
A8 = −1.7261253E−07, A10 = −1.2804751E−10
Fourth surface
k = 0.0000000E+00, A4 = 1.8247568E−04, A6 = 6.4464704E−07,
A8 = −9.6695897E−08, A10 = 7.1230986E−10
Sixth surface
k = 0.0000000E+00, A4 = −6.0286659E−05, A6 = −2.4163289E−06,
A8 = 4.0733517E−07, A10 = −2.4238062E−08

TABLE 2-continued

Ninth surface
k = 0.0000000E+00, A4 = 7.9338681E−04, A6 = −2.3392709E−05,
A8 = 1.7281532E−06, A10 = −5.5921931E−08

An aspherical shape is as defined below.

$$Z = \frac{h^2/R}{1+\sqrt{1-(1+k)(h/R)^2}} + A_4h^4 + A_6h^6 + A_8h^8 + A_{10}h^{10}$$

h: Height from optical axis
R: Vertex radius of curvature
k: Conic constant
An: n-th aspherical coefficient (n is an even number not less than 4)
Z: Distance at h from point on aspherical surface to tangential plane of aspherical surface vertex

TABLE 3

| | |
|---|---|
| F number: | 1.4 |
| Maximum half angle of view: | 91° |
| Maximum image height: | 4.08 mm |
| Entire system focal distance: | 2.04 mm |
| Back focus: | 3.417 mm (d(9) + d(10) + d(11)) |
| Entire length of lens | 31.107 mm |

Figure 2:
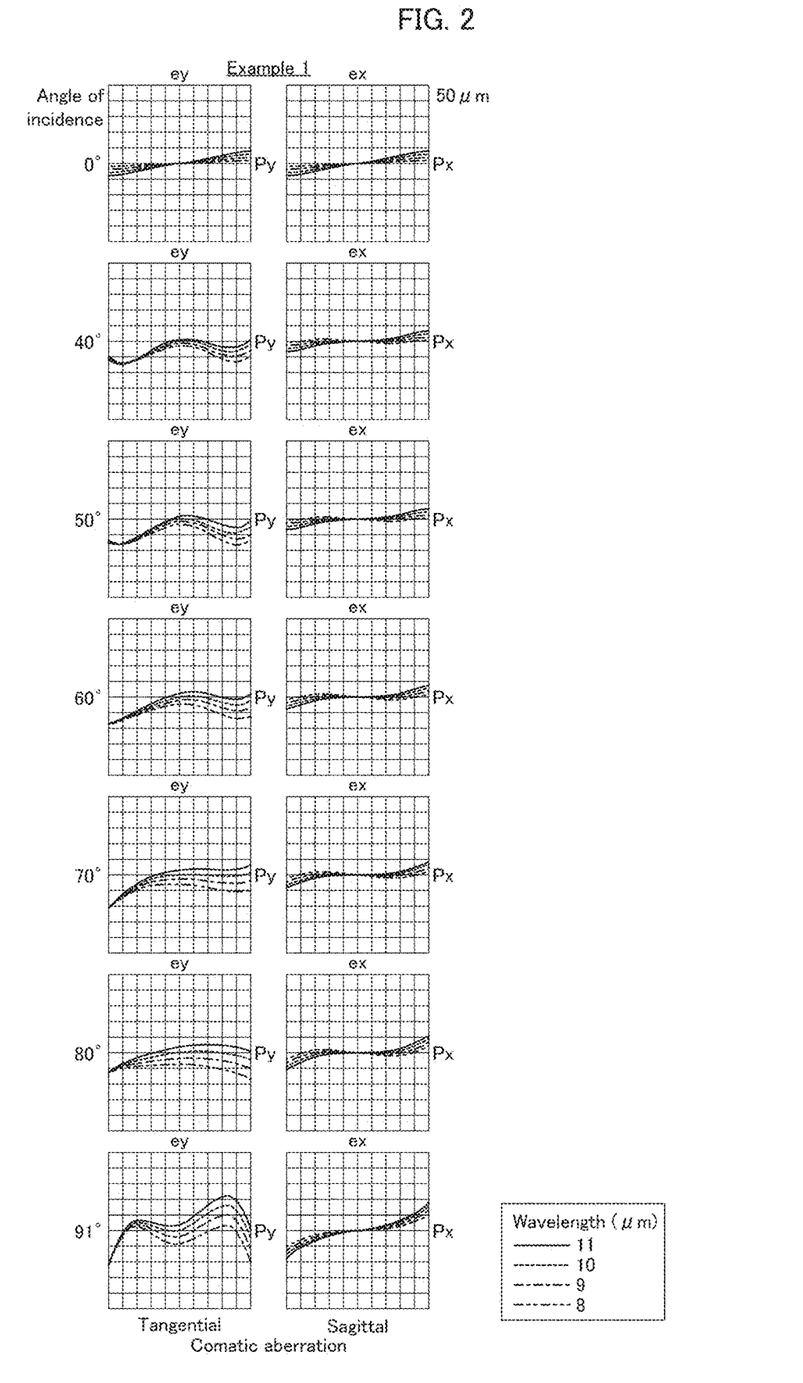
FIG. 2 is an aberration diagram illustrating comatic aberration of the infrared imaging lens in accordance with Numerical Example 1 of the present invention.
Figure 3:
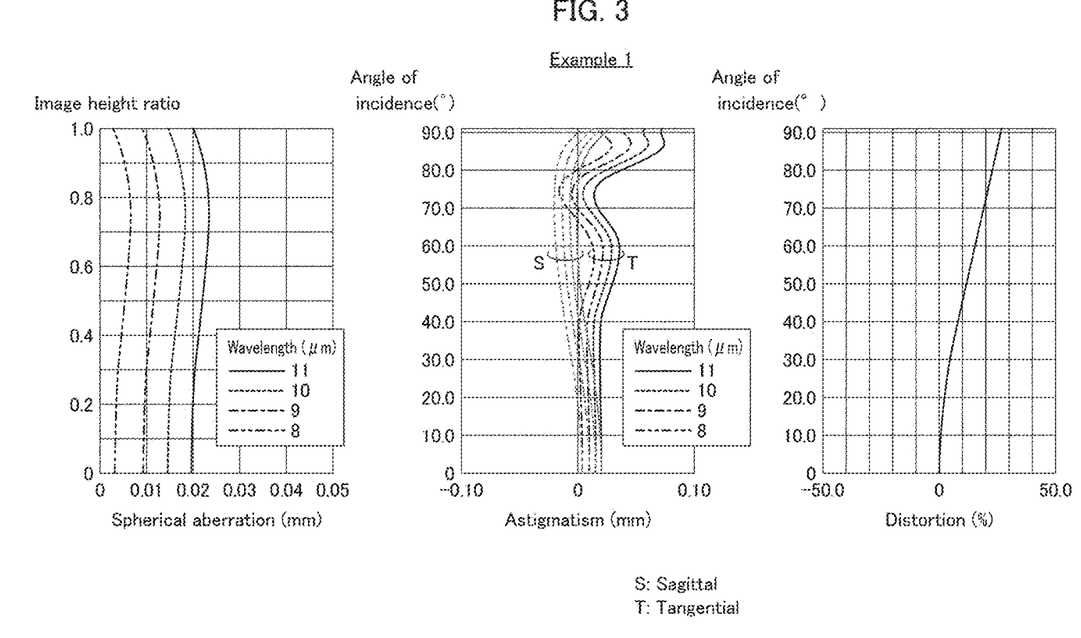
FIG. 3 is an aberration diagram illustrating spherical aberration, astigmatism, and distortion of the infrared imaging lens in accordance with Numerical Example 1 of the present invention.

Next, the following description will discuss various performance capabilities of the infrared imaging lens of Numerical Example 1. FIG. 2 is an aberration diagram illustrating comatic aberration at each angle of incidence up to an angle of incidence of 91°, which is a maximum half angle of view, for each of a tangential (meridional) direction and a sagittal (radial) direction. FIG. 3 is an aberration diagram illustrating spherical aberration, astigmatism, and distortion. As illustrated in FIGS. 2 and 3, the infrared imaging lens in accordance with Numerical Example 1 allows various types of aberration to be satisfactorily corrected.

Figure 4:
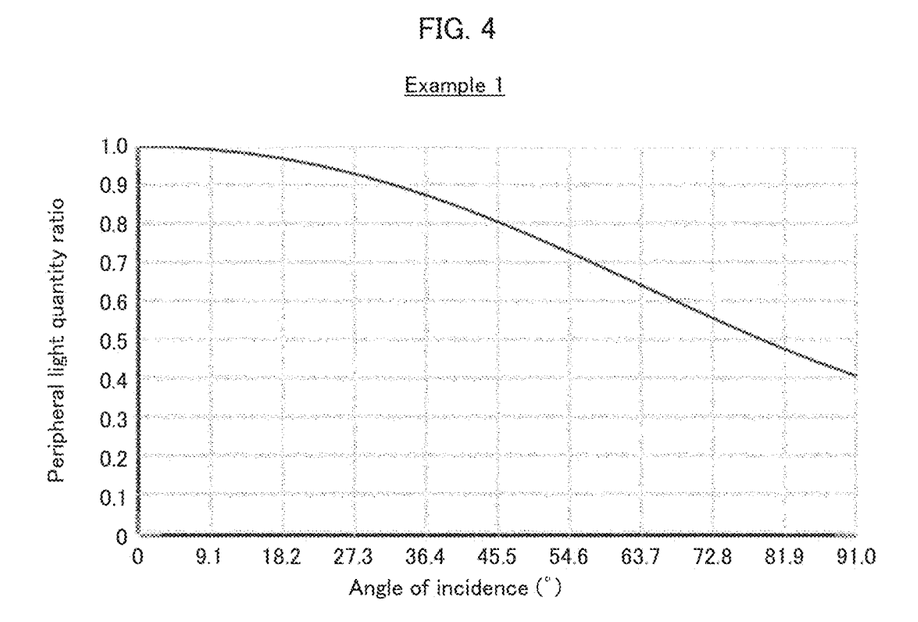
FIG. 4 is a graph showing angle-of-incidence dependence of a peripheral light quantity ratio of the infrared imaging lens in accordance with Numerical Example 1 of the present invention.

FIG. 4 is a graph showing a relationship of a peripheral light quantity ratio to an angle of incidence of the infrared imaging lens in accordance with Numerical Example 1. Note here that the peripheral light quantity ratio refers to an illuminance ratio of a certain region to an on-optical axis region (image surface central region) on the image surface. As illustrated in FIG. 4, although the infrared imaging lens in accordance with Numerical Example 1 is an infrared imaging lens which has a maximum half angle of view as large as 91°, a satisfactory peripheral light quantity as much as a peripheral light quantity ratio of approximately 41% measured at an angle of incidence of 91° (in a maximum angle-of-view region) is obtained. In a case where a common infrared image sensor having an aspect ratio of 3:4 is used, an angle of incidence corresponding to a center of right and left ends of an imaging surface is approximately 76°. A peripheral light quantity ratio measured at the center of the right and left ends of the imaging surface is approximately 52%.

Figure 5:
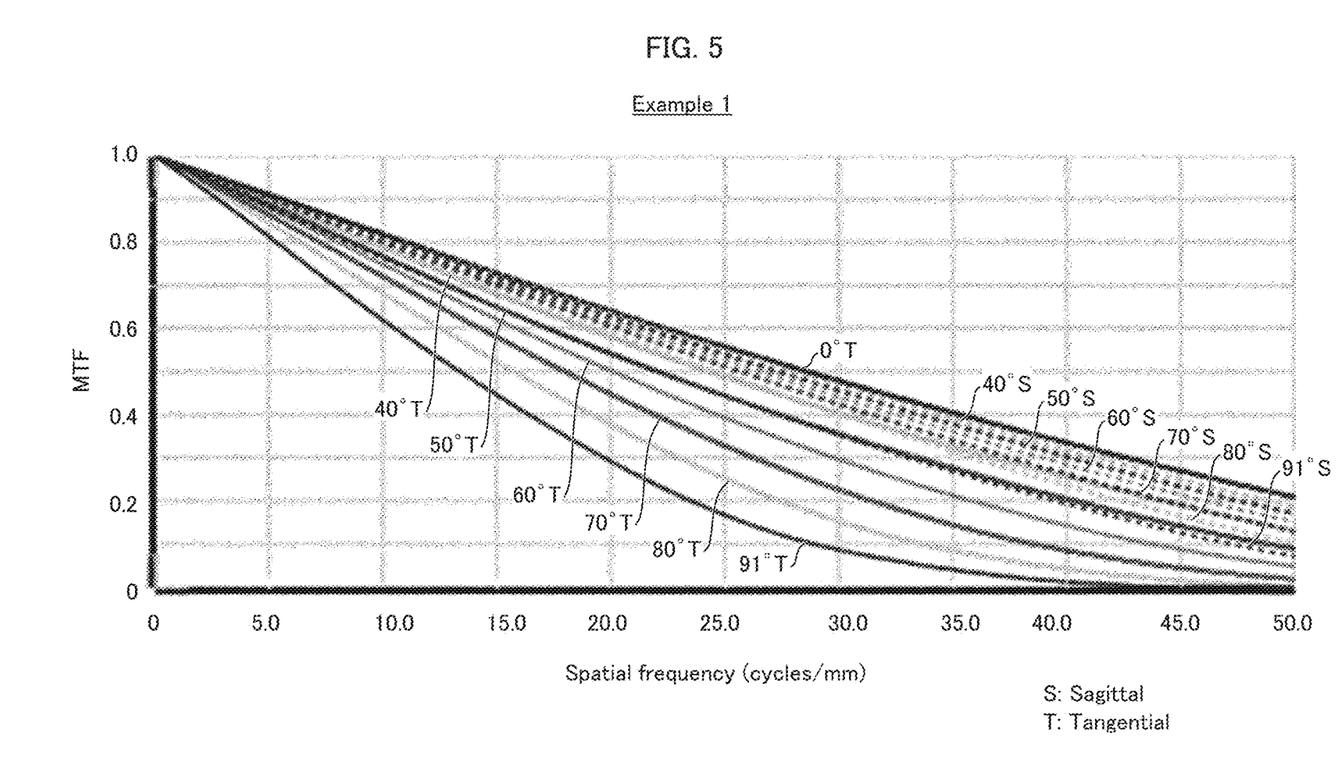
FIG. 5 is a graph showing spatial frequency dependence of an MTF of the infrared imaging lens in accordance with Numerical Example 1 of the present invention.
Figure 6:
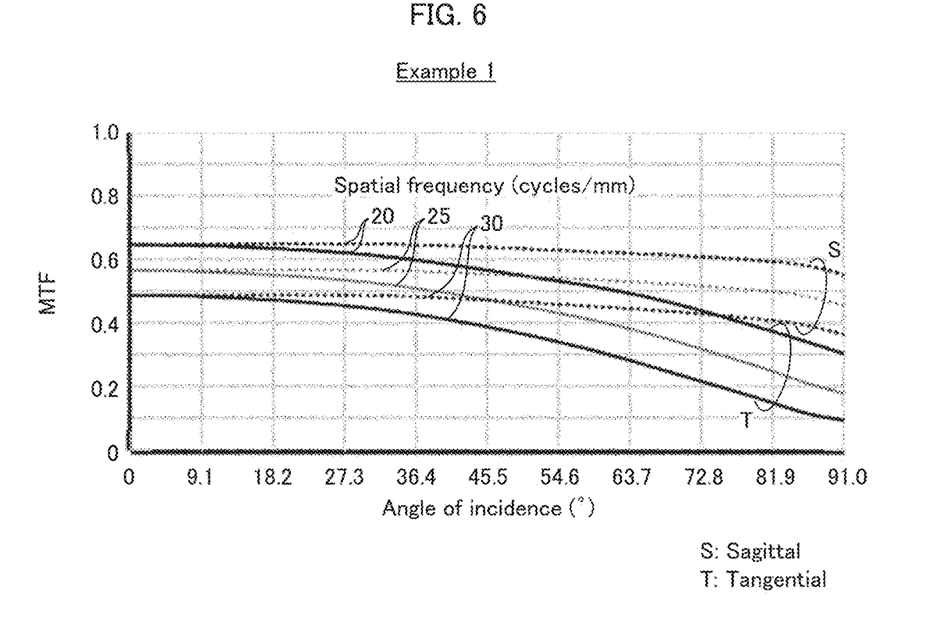
FIG. 6 is a graph showing angle-of-incidence dependence of an MTF of the infrared imaging lens in accordance with Numerical Example 1 of the present invention.
Figure 7:
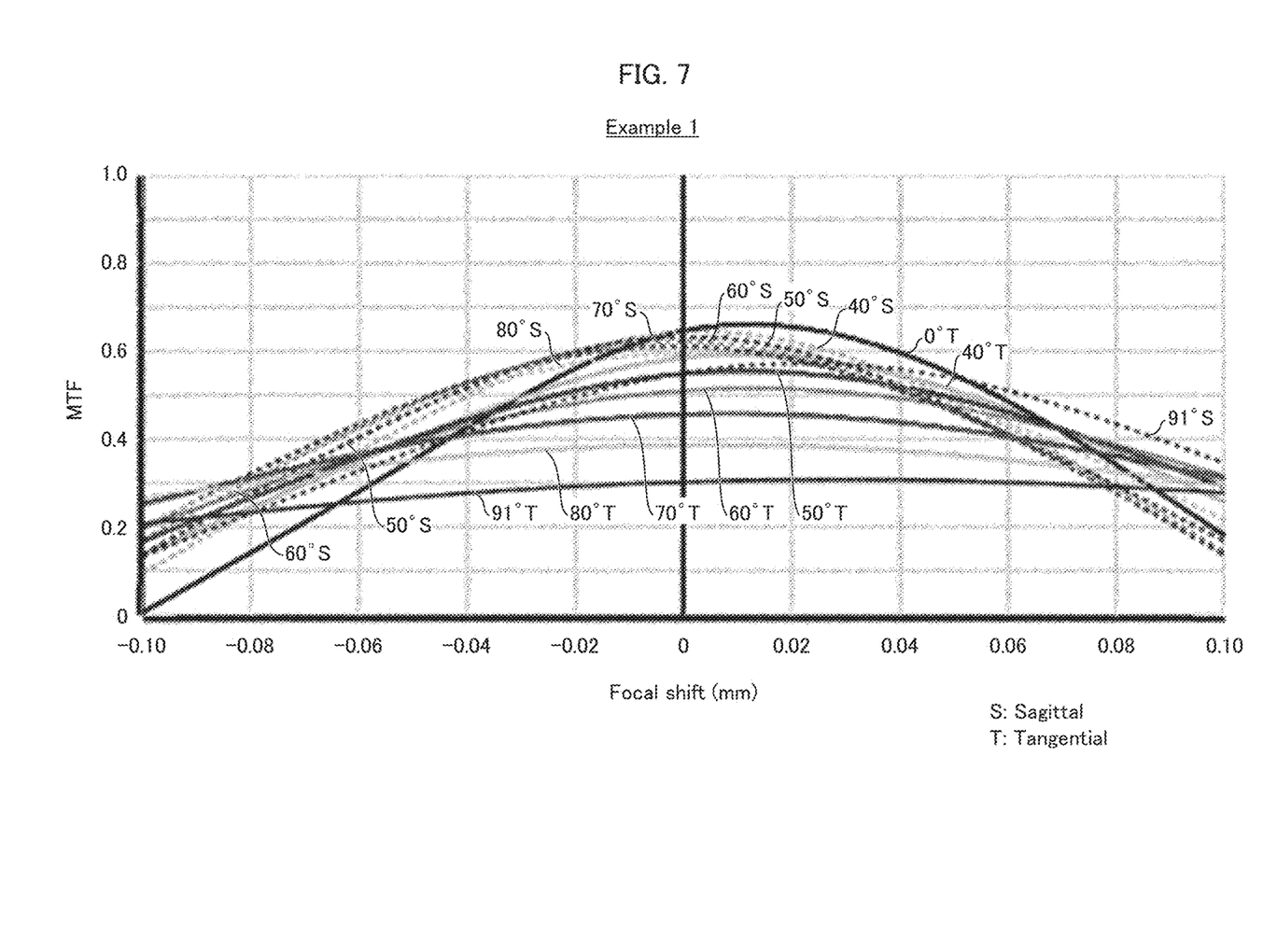
FIG. 7 is a graph showing focal shift dependence of an MTF of the infrared imaging lens in accordance with Numerical Example 1 of the present invention.

FIG. 5 is a graph showing spatial frequency dependence of a modulation transfer function (MTF). FIG. 6 is a graph showing angle-of-incidence dependence of an MTF. In FIGS. 5 to 7, a result concerning the tangential direction with respect to each angle of incidence is shown by a solid line, and a result concerning the sagittal direction with respect to each angle of incidence is shown by a broken line.

An image sensor for a far infrared region which image sensor has a pixel pitch of 17 μm, which is common in an image sensor for a far infrared region, has a Nyquist frequency corresponding to 29.4 cycle/mm. An MTF obtained at the center of the imaging surface (at an angle of incidence of 0°) was 48% at a spatial frequency of 29.4 cycle/mm.

Although the infrared imaging lens in accordance with Numerical Example 1 is an infrared imaging lens which has a maximum half angle of view as large as 91°, an MTF obtained at an angle of incidence of 91° was 23% as an average of MTFs in the sagittal direction and the tangential direction. An MTF obtained at a spatial frequency of 29.4 cycle/mm at the center of right and left ends of the imaging surface (at an angle of incidence of approximately 76°) was 29% as an average of the MTFs in the sagittal direction and the tangential direction. Although the infrared imaging lens in accordance with Numerical Example 1 is a wide-angle of view infrared imaging lens thus having a maximum half angle of view as large as 91°, satisfactory MTFs have been obtained. FIG. 7 is a graph showing a change in MTF with respect to a focal shift.

<Chalcogenide Glass>

Next, the following description will discuss chalcogenide glass which is applied to the infrared imaging lens 1 of the present embodiment.

The chalcogenide glass contains, as an essential component, tellurium (Te), which is a chalcogen element. Te is a component of which a glass skeleton is formed and which increases an infrared transmittance. A Te content (molar fraction) is 20% to 90%. The Te content is preferably 30% to 88%, 40% to 84%, and 50% to 82%, and particularly preferably 60% to 80%.

A too low Te content is less likely to cause vitrification and is more likely to lower the infrared transmittance. In contrast, a too high Te content is more likely to cause a deterioration in thermal stability of glass (stability of vitrification) and cause deposition of Te-based crystals. Note that, as compared with Te, selenium (Se) and sulfur (S), which are other chalcogen elements, (i) are less likely to increase the infrared transmittance and (ii) are more likely to cause the chalcogenide glass to have a shorter infrared absorption edge wavelength.

Thus, an Se content is preferably 0% to 40%, 0% to 20%, 0% to 10%, and 0% to 5%, and the chalcogenide glass particularly preferably contains substantially no Se. Furthermore, an S content is preferably 0% to 40%, 0% to 20%, 0% to 10%, and 0% to 5%, and the chalcogenide glass particularly preferably contains substantially no S. Note that the expression "contains substantially no . . . " herein means "a raw material is intentionally caused to contain no . . . " and does not exclude an order of magnitude of impurity contamination. It is objectively preferable that each component be contained in an amount of less than 0.1%.

A component which is contained in the chalcogenide glass and which is different from the essential components listed earlier is selected from among elements listed below, and is configured such that a contained amount (molar fraction) of all components of the chalcogenide glass is 100%.

Germanium (Ge) is a component which, without decreasing the infrared transmittance, extends a vitrification range and allows glass to be more thermally stable. A Ge content is 0% to 50%. The Ge content is preferably 1% to 40%, 3% to 35%, 5% to 30%, and 7% to 25%, and particularly preferably 10% to 20%. A too high Ge content is more likely to cause deposition of Ge-based crystals and tends to cause raw material cost to be high.

Gallium (Ga) is a component which, without decreasing the infrared transmittance, extends the vitrification range and allows glass to be more thermally stable. A Ga content is 0% to 50%. The Ga content is preferably 1% to 30%, 2% to 20%, and 3% to 15%, and particularly preferably 4% to 10%. A too high Ga content is more likely to cause deposition of Ga-based crystals and tends to cause raw material cost to be high.

Silver (Ag) is a component which allows glass to be more thermally stable. An Ag content is 0% to 50%. The Ag content is preferably more than 0% to 50%, 1% to 45%, 2% to 40%, 3% to 35%, 4% to 30%, and 5% to 25%, and particularly preferably 5% to 20%. A too high Ag content is less likely to cause vitrification.

Aluminum (Al), titanium (Ti), copper (Cu), indium (In), tin (Sn), bismuth (Bi), chromium (Cr), antimony (Sb), zinc (Zn), and manganese (Mn) are components each of which allows glass to be more thermally stable without degrading an infrared transmission property. An Al, Ti, Cu, In, Sn, Bi, Cr, Sb, Zn, and Mn content (a combined amount of Al, Ti, Cu, In, Sn, Bi, Cr, Sb, Zn, and Mn) is 0% to 40%. The Al, Ti, Cu, In, Sn, Bi, Cr, Sb, Zn, and Mn content is preferably 2% to 35% and 4% to 30%, and particularly preferably 5% to 25%.

A too high Al, Ti, Cu, In, Sn, Bi, Cr, Sb, Zn, and Mn content is less likely to cause vitrification. Among the above components, Al, Cu, and/or Sn are/is preferably used because these components are particularly highly effective in allowing glass to be more thermally stable.

Fluorine (F), chlorine (Cl), bromine (Br), and iodine (I) are also components each of which allows glass to be more thermally stable. An F, Cl, Br, and I content (a combined amount of F, Cl, Br and I) is 0% to 40%. The F, Cl, Br, and I content is preferably 1% to 40%, 1% to 30%, and 1% to 25%, and particularly preferably 1% to 20%.

A too high F, Cl, Br, and I content is less likely to cause vitrification and is more likely to cause a decrease in weatherability. Among the above components, I is preferable. This is because I can be an element material and is particularly highly effective in allowing glass to be more thermally stable.

Silicon (Si) is a component which allows glass to be more thermally stable. An Si content is 0% to 50%. The Si content is preferably more than 0% to 50%, 1% to 45%, 2% to 40%, 3% to 35%, 4% to 30%, and 5% to 25%, and particularly preferably 5% to 20%. A too high Si content is more likely to cause infrared absorption caused by Si. This makes infrared transmission difficult.

Furthermore, the chalcogenide glass preferably contains substantially none of cadmium (Cd), thallium (Tl), and lead (Pb).

The chalcogenide glass which is applied to the infrared imaging lens 1 of the present embodiment is produced as below. First, in order that a glass composition described earlier is achieved, raw materials are mixed so as to obtain a raw material batch. Next, after a quartz glass ampoule is evacuated while being heated, the raw material batch is fed into the quartz glass ampoule, and an oxy-fuel burner is used to seal the quartz glass ampoule. It is only necessary that oxygen gas ($O_2$) be absent in the quartz glass ampoule. For example, the atmosphere inside the quartz glass ampoule can be replaced with inert gas. The inert gas is preferably nitrogen gas ($N_2$), which is inexpensive and highly safe.

Subsequently, the sealed quartz glass ampoule is heated to 650° C. to 1000° C. in a melting furnace at a rate of 10° C. to 40° C./hour and retained for a period of 6 hours to 12 hours. During the period for which the sealed quartz glass ampoule is retained, the quartz glass ampoule is turned upside down as appropriate so that a melt is stirred.

In a case where melting is thus carried out in the absence of oxygen gas ($O_2$) in the quartz glass ampoule, a Ge—O bond (13.0 µm), an Se—O bond (11.0 µm), an As—O bond (12.7 µm), an Si—O bond (8.9 µm, 14.2 µm), a Ga—O bond (17.5 µm), and the like each of which has an absorption peak in a far infrared region are less likely to occur. This easily prevents or reduces a decrease in infrared transmittance.

Furthermore, in a case where oxygen (O) is incorporated into chalcogenide glass, a stria and/or a stone of an oxide such as a Ga oxide is/are easily produced. Such a stria and/or such a stone also cause(s) a deterioration in infrared transmission property. However, the chalcogenide glass which is applied to the infrared imaging lens 1 of the present embodiment has a good infrared transmission property by being produced while these phenomena are prevented. Moreover, the chalcogenide glass which is applied to the infrared imaging lens 1 of the present embodiment is uniformly configured to have a specific composition and achieves a refractive index as high as not less than 2.8.

Subsequently, the quartz glass ampoule is taken out from the melting furnace and rapidly cooled to a room temperature so that chalcogenide glass is produced.

Note that the melting furnace the inside of which is brought into an atmosphere of inert gas allows melting without the need to seal the quartz glass ampoule, so that the chalcogenide glass can be successively melted. Note also that inert gas can be bubbled in molten glass. Bubbling of inert gas allows glass to be stirred, so that homogenization of the glass can be promoted. This makes it possible to prevent or reduce occurrence of, for example, a stria.

Next, the chalcogenide glass is fed into a precision-processed mold and press-molded, while being heated, until the chalcogenide glass is softened, so that a surface shape of the mold is transferred to the chalcogenide glass. In this way, it is possible to produce a chalcogenide glass lens which has a required shape and which is applied to the infrared imaging lens 1.

Figure 8:
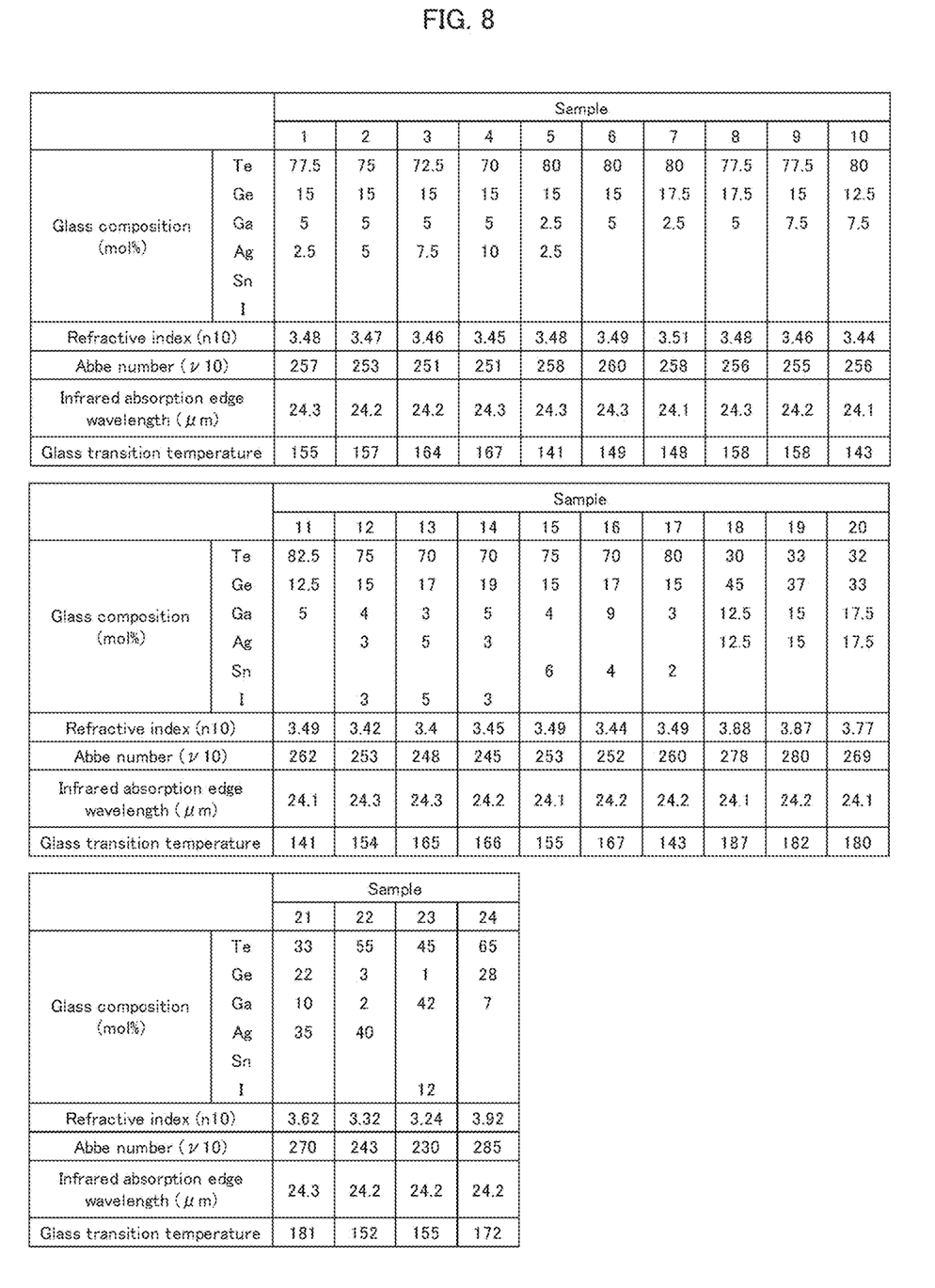
FIG. 8 is a diagram showing results (sample data) of a chalcogenide glass production test which results are obtained in an embodiment of the present invention.

FIG. 8 shows results of evaluation of chalcogenide glass (sample numbers 1 to 24) produced by a production process (described earlier) at various raw material ratios. FIG. 8 also shows a refractive index n10, an Abbe number v10, and an infrared absorption edge wavelength.

These samples of chalcogenide glass have a refractive index of not less than 2.8 measured at a wavelength of 10 µm. These samples have actually demonstrated achievement of chalcogenide glass having a refractive index in a range of 3.24 to 3.92 and an Abbe number in a range of 230 to 285.

The chalcogenide glass had an infrared absorption edge wavelength of not less than 24.1 µm and had a good transmittance at least in a wavelength range of 8 µm to 14 µm. Furthermore, the chalcogenide glass had an internal transmittance, measured at a thickness of 2 mm, of not less than 90% at a wavelength of 12 µm. The chalcogenide glass had a glass transition point as low as not more than 200° C. and facilitated lens formation by pressing.

Note that chalcogenide glass which is more preferably applied to the infrared imaging lens 1 of the present embodiment has a refractive index of not less than 3.3. A refractive index n10 of not less than 3.3 measured at a wavelength of 10 µm was obtained in the samples of the sample numbers 1 to 24 in FIG. 8 except the sample number 23.

The samples except the sample number 23 are examples of chalcogenide glass, each of which is more preferably applied to the infrared imaging lens 1 of the present embodiment. These samples have actually demonstrated achievement of chalcogenide glass having a refractive index in a range of 3.32 to 3.92 and an Abbe number in a range of 243 to 285. In this case, it has been demonstrated that a required property (a refractive index of not less than 3.3) is obtained in a case where the Ge content is at least in a range of 3% to 45%, the Ga content is at least in a range of 2% to 17.5%, and the I content is at least in a range of 0% to 5%.

Conventional chalcogenide glass which is applied to an infrared imaging lens of Patent Literature 2 has a refractive index n10, measured at a wavelength of 10 μm, of 2.585, which is less than 2.8. Thus, novel chalcogenide glass which is applied to the present invention has a much higher refractive index than conventional chalcogenide glass. The novel chalcogenide glass also has an appropriate Abbe number. This has resulted in achievement of a wide-angle of view infrared imaging lens 1 which has good performance capabilities shown in FIGS. 2 to 7.

Aspects of the present invention can also be expressed as follows:

An infrared imaging lens in accordance with a first aspect of the present invention includes: a first lens having negative refractive power; a second lens which is a meniscus that is convex to an image surface side; and an image surface side lens group having positive refractive power, the first lens, the second lens, and the image surface side lens group being disposed in this order from an object side to the image surface side, the first lens and the second lens each being made of glass having a refractive index of not less than 2.8 measured at a wavelength of 10 μm, and the infrared imaging lens having a half angle of view of not less than 60°.

The configuration makes it possible to achieve an infrared imaging lens which has a favorable image formation property such that, despite its wide angle of view, which is a half angle of view of not less than 60°, aberration is prevented or reduced, or a decrease in peripheral light quantity is prevented or reduced and which is adaptable to a far infrared region.

An infrared imaging lens in accordance with a second aspect of the present invention can be configured such that, in the first aspect, the glass is chalcogenide glass. The configuration makes it possible to achieve an infrared imaging lens which is highly light-transmissive at least in a wavelength range of 8 μm to 14 μm.

An infrared imaging lens in accordance with a third aspect of the present invention can be configured such that, in the second aspect, the chalcogenide glass has a refractive index of not less than 3.3 measured at a wavelength of 10 μm. The configuration allows aberration to be better prevented or reduced or allows a decrease in peripheral light quantity to be further prevented or reduced.

An infrared imaging lens in accordance with a fourth aspect of the present invention can be configured such that, in the second or third aspect, the chalcogenide glass has an infrared absorption edge wavelength of not less than 20 μm at which the chalcogenide glass has a light transmittance of 20% measured at a thickness of 2 mm. The configuration makes it possible to achieve a bright infrared imaging lens which is highly light-transmissive at least in a wavelength band of 8 μm to 14 μm.

An infrared imaging lens in accordance with a fifth aspect of the present invention can be configured such that, in any one of the first to fourth aspects, a peripheral light quantity ratio of a maximum angle-of-view region to an on-optical axis region is not less than 40% on an image surface. The configuration makes it possible to achieve an infrared imaging lens which has a favorable image formation property such that a decrease in peripheral light quantity is prevented or reduced and which is adaptable to a far infrared region.

An infrared imaging lens in accordance with a sixth aspect of the present invention can be configured such that, in any one of the first to fifth aspects, the first lens is a meniscus lens that is convex to the object side. The configuration makes it possible to achieve an infrared imaging lens in which aberration is satisfactorily prevented or reduced despite its wide angle of view and which is adaptable to a far infrared region.

An infrared imaging lens in accordance with a seventh aspect of the present invention can be configured such that, in any one of the first to sixth aspects, the first lens is an aspherical lens. The configuration makes it possible to achieve, with high productivity, an infrared imaging lens in which aberration is satisfactorily prevented or reduced.

An infrared imaging lens in accordance with an eighth aspect of the present invention can be configured such that, in any one of the first to seventh aspects, the second lens is an aspherical lens. The configuration makes it possible to achieve, with high productivity, an infrared imaging lens in which aberration is satisfactorily prevented or reduced.

An infrared imaging lens in accordance with a ninth aspect of the present invention can be configured to, in any one of the first to eighth aspects, further include an aperture diaphragm disposed between the second lens and the image surface side lens group. With the configuration, a light beam can be incident on the image surface side lens group at a low height. This makes it possible to prevent or reduce comatic aberration.

An infrared imaging lens in accordance with a tenth aspect of the present invention can be configured such that, in any one of the first to ninth aspects, the image surface side lens group includes a third lens having positive refractive power and a fourth lens having positive refractive power, the third lens and the fourth lens being disposed in this order from the object side to the image surface side. The configuration makes it possible to more specifically achieve the image surface side lens group.

An infrared imaging lens in accordance with an eleventh aspect of the present invention includes: a first lens having negative refractive power; a second lens which is a meniscus that is convex to an image surface side; a third lens having positive refractive power; and a fourth lens having positive refractive power, the first lens, the second lens, the third lens, and the fourth lens being disposed in this order from an object side to the image surface side, the first lens, the second lens, the third lens, and the fourth lens each being made of glass having a refractive index of not less than 2.8 measured at a wavelength of 10 μm, and the infrared imaging lens having a half angle of view of not less than 60°.

The configuration more specifically achieves the image surface side lens group and makes it possible to achieve an infrared imaging lens which has a favorable image formation property such that, despite its wide angle of view, which is a half angle of view of not less than 60°, aberration is prevented or reduced and which is adaptable to a far infrared region.

An infrared imaging lens in accordance with a twelfth aspect of the present invention includes: a first lens having negative refractive power; a second lens which is a meniscus that is convex to an image surface side; and an image surface side lens group having positive refractive power, the first lens, the second lens, and the image surface side lens group being disposed in this order from an object side to the image surface side, the first lens and the second lens each being made of glass having a refractive index of not less than 2.8 measured at a wavelength of 10 μm, and the first lens being a meniscus lens that is convex to the object side.

The configuration makes it possible to achieve an infrared imaging lens which has a favorable image formation property such that aberration is satisfactorily prevented or reduced and a decrease in peripheral light quantity is prevented or reduced and which is adaptable to a far infrared region.

An infrared imaging lens in accordance with a thirteenth aspect of the present invention can be configured such that, in any one of the first to twelfth aspects, the glass has a glass transition temperature of not more than 200° C. The configuration allows easy lens formation by pressing and makes it possible to achieve an infrared imaging lens which has excellent mass productivity, in which aberration can be prevented or reduced by application of an aspherical lens to the infrared imaging lens, and which is adaptable to a far infrared region.

The present invention is not limited to the embodiments, but can be altered by a skilled person in the art within the scope of the claims. The present invention also encompasses, in its technical scope, any embodiment derived by combining technical means disclosed herein. Further, it is possible to form a new technical feature by combining the technical means disclosed herein.

REFERENCE SIGNS LIST

1 Infrared imaging lens
L1 First lens
L2 Second lens
A Aperture diaphragm
G Image surface side lens group
L3 Third lens
L4 Fourth lens
P Parallel flat plate
S Image surface

The invention claimed is:
1. An infrared imaging lens comprising:
a first lens having negative refractive power;
a second lens which is a meniscus that is convex to an image surface side; and
an image surface side lens group having positive refractive power,
the first lens, the second lens, and the image surface side lens group being disposed in this order from an object side to the image surface side,
the image surface side lens group including a third lens having positive refractive power and being a biconvex lens and a fourth lens having positive refractive power, the third lens and the fourth lens being disposed in this order from the object side to the image surface side,
said infrared imaging lens further comprising an aperture diaphragm disposed between the second lens and the image surface side lens group,
the first lens and the second lens each being made of chalcogenide glass containing Te and having a refractive index of not less than 3.3 measured at a wavelength of 10 μm, and
the infrared imaging lens having a half angle of view of not less than 60°.

2. The infrared imaging lens as set forth in claim 1, wherein the first lens is a meniscus lens that is convex to the object side.

3. The infrared imaging lens as set forth in claim 2, wherein the first lens is an aspherical lens.

4. The infrared imaging lens as set forth in claim 3, wherein the second lens is an aspherical lens.

5. An infrared imaging lens comprising:
a first lens having negative refractive power;
a second lens which is a meniscus that is convex to an image surface side;
a third lens having positive refractive power and being a biconvex lens; and
a fourth lens having positive refractive power,
the first lens, the second lens, the third lens, and the fourth lens being disposed in this order from an object side to the image surface side,
said infrared imaging lens further comprising an aperture diaphragm disposed between the second lens and the third lens,
the first lens, the second lens, the third lens, and the fourth lens each being made of chalcogenide glass containing Te and having a refractive index of not less than 3.3 measured at a wavelength of 10 μm, and
the infrared imaging lens having a half angle of view of not less than 60°.

6. An infrared imaging lens comprising:
a first lens having negative refractive power;
a second lens which is a meniscus that is convex to an image surface side; and
an image surface side lens group having positive refractive power,
the first lens, the second lens, and the image surface side lens group being disposed in this order from an object side to the image surface side,
the image surface side lens group including a third lens having positive refractive power and being a biconvex lens and a fourth lens having positive refractive power, the third lens and the fourth lens being disposed in this order from the object side to the image surface side,
said infrared imaging lens further comprising an aperture diaphragm disposed between the second lens and the image surface side lens group,
the first lens and the second lens each being made of chalcogenide glass containing Te and having a refractive index of not less than 3.3 measured at a wavelength of 10 μm, and
the first lens being a meniscus lens that is convex to the object side.

7. The infrared imaging lens as set forth in claim 1, wherein the glass has a glass transition temperature of not more than 200° C.

8. The infrared imaging lens as set forth in claim 1, wherein the fourth lens is a meniscus lens that is convex to the image surface side.

9. The infrared imaging lens as set forth in claim 5, wherein the fourth lens is a meniscus lens that is convex to the image surface side.

10. The infrared imaging lens as set forth in claim 1, wherein the infrared imaging lens has a half angle of view of not less than 80°.

* * * * *